Figure 1:
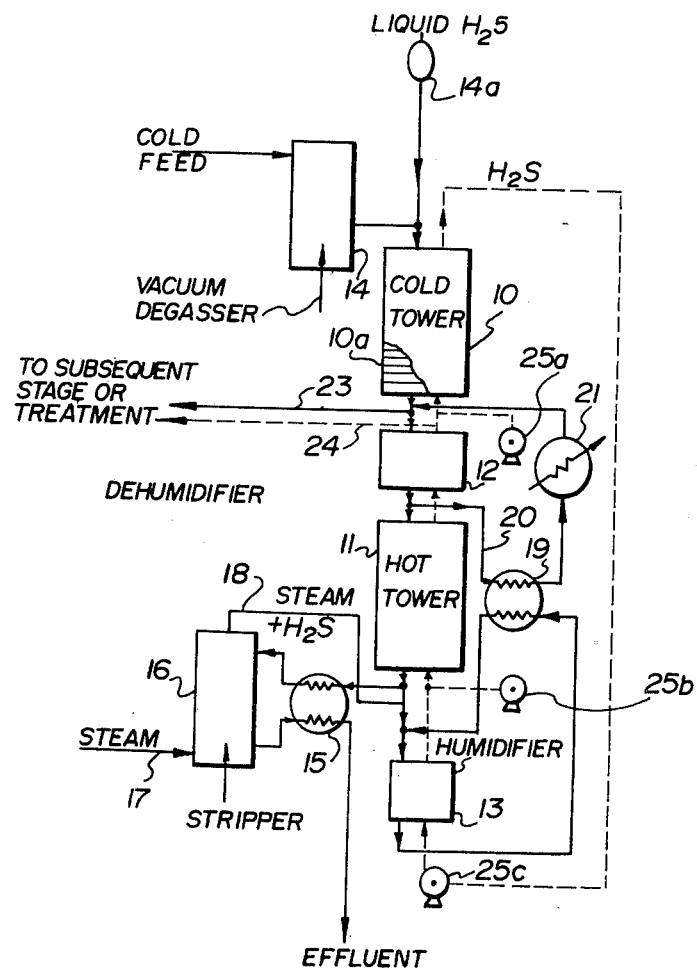

United States Patent [19]

Strathdee

[11] 4,125,598
[45] Nov. 14, 1978

[54] METHOD FOR HEAVY-WATER PRODUCTION BY $H_2S$-$H_2O$ CHEMICAL EXCHANGE PROCESS

[75] Inventor: Graeme G. Strathdee, Pinawa, Canada

[73] Assignee: Atomic Energy of Canada Limited, Ottawa, Canada

[21] Appl. No.: 721,113

[22] Filed: Sep. 7, 1976

[30] Foreign Application Priority Data

Dec. 19, 1975 [CA] Canada .................................... 242154

[51] Int. Cl.² .............................................. C01B 5/00
[52] U.S. Cl. ...................................... 423/580; 423/563
[58] Field of Search .............. 23/260; 423/580 H, 563

[56] References Cited

U.S. PATENT DOCUMENTS

| | | | |
|---|---|---|---|
| 2,952,525 | 9/1960 | Harteck | 423/580 H |
| 2,954,279 | 9/1960 | Harteck | 423/580 H |
| 2,967,089 | 1/1961 | Mills et al. | 423/580 H |

Primary Examiner—O. R. Vertiz
Assistant Examiner—Wayne A. Langel
Attorney, Agent, or Firm—J. R. Hughes

[57] ABSTRACT

A heavy water production stage in a bithermal $H_2S$ gas - $H_2O$ liquid exchange plant wherein the cold tower is operated under temperature and pressure conditions such that $H_2S$ in the liquid phase is formed and is maintained in the separation units (sieve trays or plates) of the cold tower. It has been found that the presence of liquid $H_2S$ acts as an efficient anti-foaming agent.

1 Claim, 2 Drawing Figures

METHOD FOR HEAVY-WATER PRODUCTION BY $H_2S$-$H_2O$ CHEMICAL EXCHANGE PROCESS

This invention relates to an improvement to the method of operation of a heavy water production plant and more particularly to a method of operating an $H_2S$ - $H_2O$ isotope exchange process of the Girdler-Sulphide (GS) type.

The production of heavy water in the United States and Canada has almost completely been by the G-S process. This method is described in Canadian Pat. No. 574,293 issued Apr. 21, 1959 to Atomic Energy of Canada Limited and in U.S. Pat. No. 2,787,526 issued Apr. 2, 1957 to the U.S. Atomic Energy Commission. The system involves separation stages made up of pairs of hot and cold towers with a liquid (normally water) and a gas (normally $H_2S$) passing in countercurrent isotope exchange relationship in the towers. The towers contain a series of transfer units usually sieve trays. The pressure and temperature of the towers must be controlled to provide optimum, economic separation action.

Heavy water plants employing bithermal $H_2S$ - $H_2O$ isotope exchange have traditionally operated with cold exchange towers where the pressure was low enough and the temperature high enough that only two phases exist, namely aqueous liquid and water saturated $H_2S$ gas. The traditional approach has been dictated by the need to maintain sufficiently high temperature that a third phase, the ice-like solid hydrate, does not form in the tower. Design practice has also traditionally rejected as completely undesirable, a fourth phase, i.e. liquid $H_2S$, which would form if the tower pressure were raised.

One of the problems involved in G-S plants has been undue foaming in the sieve trays in the cold tower. This results in poorer transfer and separation efficiencies.

It is therefore an object of the invention to provide a method of operating a heavy water separation stage that results in reduced foaming on the trays or plates in the cold tower.

This and other objects of the invention are achieved by a heavy water production stage in a bithermal $H_2S$ gas - $H_2O$ liquid exchange plant wherein the cold tower is operated under temperature and pressure conditions such that $H_2S$ in the liquid phase is formed and is maintained in the separation units (sieve trays or plates) of the cold tower.

Based on the results of research completed by applicant, liquid $H_2S$ has been found to possess a positive "spreading coefficient" on a solution of aqueous $H_2S$ with which it is in equilibrium. The spreading coefficient is a measure of the capability of one liquid to spontaneously spread on the surface of another due to favourable molecular interactions. It has been pointed out that good antifoam agents must spread on the surface of foamy solutions, that is, they must possess positive spreading coefficients (c.f. Chemical Engineering Progress 63 (9), 41 (1967). Applicant has found that liquid $H_2S$ has a low but positive spreading coefficients on aqueous $H_2S$ solutions, therefore should function as a good antifoam agent under the conditions specified below.

Figure 2:
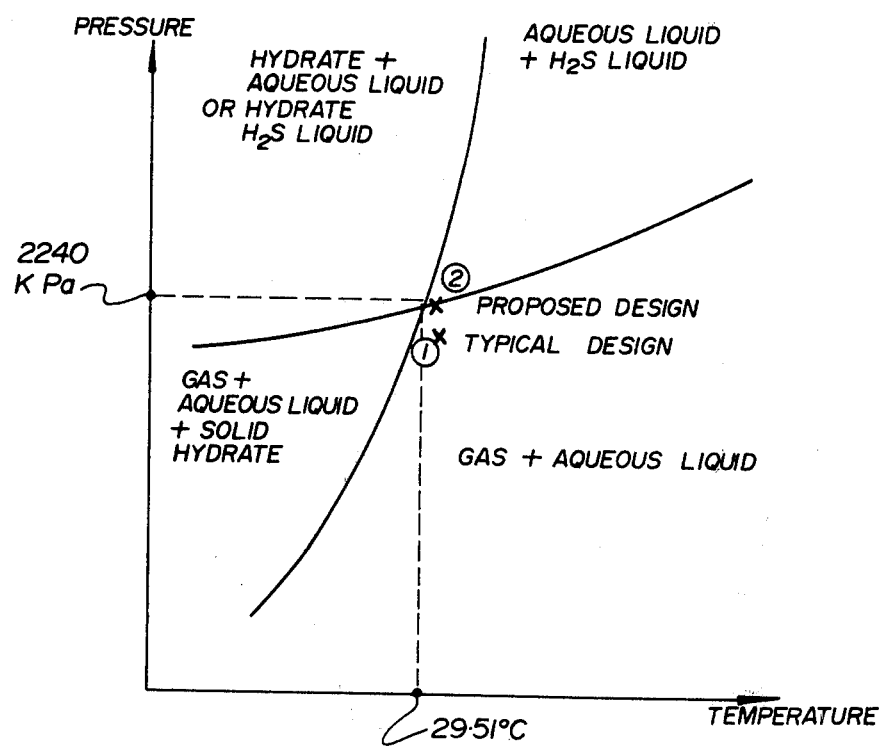

In the drawings which illustrate an embodiment of the invention:

FIG. 1 is a flow diagram of a separation stage of a conventional heavy water plant, and FIG. 2 is a pressure-temperature diagram for an $H_2S$ - $H_2O$ exchange system.

Referring to FIG. 1, a typical separation stage includes a hot tower 10, a cold tower 11 a dehumidifier 12, and a humidifier 13. These elements contain a series of separation plates or trays 10a, e.g. the cold tower may have up to 100 trays. $H_2S$ gas is recycled through the towers and passes upwardly in countercurrent exchange relation to liquid water introduced via vacuum degasser and water conditioned 14 and injector 14a to the top of the cold tower and passing downwardly through the towers. Heat exchange between humidifier and dehumidifier is provided by heat exchanger 19 and temperature control in the dehumidifier loop is provided by cooler 21. A portion of the water leaving the hot tower passes through heat exchanger 15 and stripper 16 to which steam (17) under pressure is injected. Steam and $H_2S$ (18) from the stripper is injected back into the hot tower. An output of enriched water or liquid may be taken as shown at points 23 and 24. In general the pressure of the system is an overall design consideration involving the input and output pressures and pressure drops throughout the various components. The system is shown here to be pressurized with pressures being maintained by a gas compressor located at position 25c. Water pumps are located at positions 25a and 25b but do not in general assist in maintaining pressure levels. Temperatures are maintained by the overall design of water conditioners, heat exchange relations, and steam injection systems although additional heating and cooling may be provided.

The present invention is concerned with the operation of system as exemplified above such that liquid $H_2S$ is formed or is introduced into the cold tower and its occurrence is maintained in the separation units (sieve trays) throughout the tower. It will be realized that the invention will also apply to other separation stage designs and configurations as well.

The situation is illustrated in FIG. 2, which is a schematic pressure-temperature phase diagram for the $H_2S$ - $H_2O$ system. The lines of hydrate formation and liquefaction at a quadruple (phase) point around 29.51° C. and 2240 kPa (kiloPascals) (absolute). Point A shows typical present practice of designing cold towers to operate around 2170 kPa and 30.5° C. In all plants designed to date the operating practice precludes liquefaction. The present invention is to deliberately design for the presence of liquid $H_2S$ with a cold tower at point B in FIG. 2, just to the right of the quadruple point. This has several advantages:

1. The condensation of $H_2S$ releases latent heat and stabilizes the tower temperature above the hydrate formation temperature. Hence no hydrate forms and the undesirable foaming action attributed to hydrate formation cannot occur;
2. The liquid $H_2S$ exerts a beneficial effect on the stability of the process by virtue of its properties as an antifoam agent;
3. Higher pressures in the cold towers also give higher pressures in the hot towers and these can be designed for hotter operation without increase in the humidity of heat input loads. This increases the extractive efficiency of the process;
4. Temperature profiles in cold towers are maintained at the liquefaction temperature with a beneficial reduction in temperature spread.

The presence of liquid $H_2S$ will arise naturally in properly designed and operated apparatus. Sufficiently cool water entering the top of cold tower will condense a small part of the H₂S gas flow leaving the tower and this will then flow downward with the water flow to finally revaporize the H₂S gas on leaving the cold tower and entering the dehumidifier where the water flow is raised to near hot tower temperatures. In essence, the liquefied H₂S recycles through the cold tower continuously.

By making the decision to employ liquid H₂S as an intrinsic or "built-in" antifoamer in G-S process cold towers, criteria are immediately established for the operating conditions in those pressure vessels. To obtain a constant dispersion ratio of liquid H₂S to liquid water of, say, 1.0 percent on all trays in the contactor it will be necessary to control the axial temperature gradient in such a manner that there is no net evaporation nor condensation of H₂S upon any tray. Because of the uniform pressure drops across each contactor tray, there is essentially a linear drop in pressure from the bottom of a cold tower where the recirculating H₂S is injected from the dehumidifier zone up to the top of the cold tower where the H₂S leaves to be re-compressed. If the inlet pressure at the bottom of the cold tower is set at $P_1$ kPa, then the system pressure at the $n^{th}$ contactor tray above that point is given simply by $$P_i = P_1 - n\Delta P$$

where $\Delta P$ is the pressure-drop per tray. The required temperature at tray $n$, $T_n$, may then be calculated from the variation in vapour pressure of wet H₂S with temperature by using the formula:

$$T_n = \frac{1}{\frac{1}{T_1} - \frac{1}{m} \ln \frac{P_1}{P_n}}$$

where $m$ is the slope of the plot of $\ln$ (vapour pressure of H₂S) against $T^{-1}$.

By knowing the pressure and temperature profiles necessary to maintain an equilibrium distribution of liquid H₂S throughout the cold tower, and by controlling the conditions as specified, the objective of this invention is achieved.

The counterflowing H₂S gas in the cold tower experiences a slight cooling due to Joule-Thompson expansion as it ascends the cold tower. This has the effect of imposing a very similar temperature profile on the water. However, in the presence of liquid H₂S, the steepness of the temperature profile is moderated and some of the cooling absorbed by slight further liquefaction. The result is a small increase in the amount of liquid H₂S as the liquid flow descends the cold tower. This acts as an excellent stabilizing influence on the presence of liquid H₂S in the cold tower. Once formed on the top tray of the cold tower, it will not be absent until external heating is applied—as at the dehumidifier section.

Despite its net overall advantage, the presence of liquid H₂S counterflow itself acts in the direction of reducing deuterium extraction. Since the benefits require only a minimal presence of H₂S liquid, it will normally be advantageous to design for only a very small proportion of liquid H₂S. Studies have shown that conditions can easily be set and controlled to give a liquid H₂S flow down the cold tower in the range of one third to one percent of the normal H₂S flow on a molar basis. In this case, the overall gain in extraction is calculated to be 3.6% at equal throughputs of water and recirculated H₂S gas. Further substantial advantage can be gained by increased throughput available from the more dense gas at higher pressure and the antifoam properties of liquid H₂S.

It is implicit in the concept of this invention that it is not essential to provide new and separate hardware for the addition and removal of hydrogen sulphide from the cold tower. Because the temperature within the pressure vessel is controlled to maintain equilibrium of liquid H₂S with the H₂S gas above a given tray, the liquid H₂S component may be regarded as existing under conditions of total reflux at all points. There will be no net addition or withdrawal of H₂S (as gas or liquid) under the steady-state conditions. To obtain the liquefaction of H₂S initially, the pressure and temperature may be adjusted to promote condensation (lower temperature at fixed pressure, or raise Pressure at fixed temperature).

Alternatively if it becomes desirable to add or remove H₂S from the cold tower then several methods may be considered including:
(i) withdrawal of gaseous H₂S and compression to yield liquid H₂S;
(ii) withdrawal of gaseous H₂S followed by cooling in a condenser held above 29.4° C. (the upper H₂S-hydrate quadruple point) to yield liquid H₂S;
(iii) re-injection of liquid H₂S with the feedwater to the top of the cold tower in a conventional manner;
(iv) re-injection of liquid H₂S at some other desired location of the cold tower;
(v) local in-tower liquefaction of gaseous H₂S on by means of a cold tower temperature profile trimming condenser.

A simulation study has been run with a tower at a pressure of 2450 kPa and it has been found that the gain in heavy water production is appreciable. Despite the assumed absence of liquefaction in the second stage cold tower, the lowest practicable pressure in the high stage also in advantageous. Table 1 summarizes the results for a La Prade Heavy Water Plant design flowsheet.

TABLE I

| | Production (mol/s) | Production Gain (%) | Coldest Temp. (° C) | Hot Tower Temp. (° C) |
|---|---|---|---|---|
| Best unliquified case at 2300 kPa | .22629 | — | 29.58 | 130.0 |
| Liquified at 2600 kPa | .22840 | 0.93 | 33.04 | 135.5 |
| Liquified at 2450 kPa | .23438 | 3.58 | 30.25 | 133.7 |
| Liquified at 2450 kPa, 2nd stage 2600 kPa | .23434 | 3.56 | 30.25 | 133.7/ 135.5 |
| Liquified at 2450 kPa, 2nd stage 3000 kPa | .23434 | 3.56 | 30.25 | 133.7/ 139.5 |
| Case run hydrate at 2170 kPa | .22942 | 1.38 | 29.02 | 130.0 |

All cases had hot tower temperatures adjusted to give equal humidity (and heat loads). The hydrate case was assumed stable to give a lower bound on the achievable extraction without liquefication. It appears that liquid H₂S not only may provide a degree of foam stabilization but also occupies the ultimate pinnacle of deuterium extraction.

What is claimed is:

1. A method of operation of a stage in a bithermal H₂S gas - H₂O liquid isotope exchange process having hot and cold exchange regions incorporating separation units, with the H₂S gas and the H₂O liquid passing in counter-current isotope exchange relationship through the separation units in the regions, comprising operating the stage such that H₂S in the liquid phase is formed and is maintained in the separation units, the proportion of H₂S liquid to H₂O liquid in the separation units being about 1 percent.

* * * * *